(12) United States Patent  (10) Patent No.: US 8,300,249 B2
Arai  (45) Date of Patent: Oct. 30, 2012

(54) COMMAND INFORMATION MANAGEMENT APPARATUS, PRINT SYSTEM AND COMPUTER READABLE MEDIUM

(75) Inventor: Kimiyoshi Arai, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1275 days.

(21) Appl. No.: 12/041,692

(22) Filed: Mar. 4, 2008

(65) Prior Publication Data

US 2009/0002750 A1 Jan. 1, 2009

(30) Foreign Application Priority Data

Jun. 29, 2007 (JP) ................................ 2007-172207

(51) Int. Cl.
*G06F 3/12* (2006.01)
(52) U.S. Cl. ...................... 358/1.15; 358/1.11; 358/1.13; 358/1.16; 358/1.18
(58) Field of Classification Search ........................ None
See application file for complete search history.

(56) References Cited

U.S. PATENT DOCUMENTS

| | | | | |
|---|---|---|---|---|
| 6,029,238 | A * | 2/2000 | Furukawa | 712/1 |
| 6,545,766 | B1 * | 4/2003 | Shima et al. | 358/1.14 |
| 2003/0103777 | A1 * | 6/2003 | Nakamura et al. | 399/82 |
| 2004/0263870 | A1 | 12/2004 | Itoh et al. | |
| 2007/0103719 | A1 * | 5/2007 | Azuchi | 358/1.15 |
| 2007/0208837 | A1 * | 9/2007 | Tian et al. | 709/223 |
| 2007/0242301 | A1 * | 10/2007 | Tsuchie et al. | 358/1.14 |
| 2008/0007767 | A1 * | 1/2008 | Ishimaru | 358/1.15 |
| 2008/0204789 | A1 * | 8/2008 | Hooglander | 358/1.15 |
| 2008/0239368 | A1 * | 10/2008 | Ota | 358/1.15 |

FOREIGN PATENT DOCUMENTS

| | | |
|---|---|---|
| JP | 2001-205863 A | 7/2001 |
| JP | 2004-185352 A | 7/2004 |
| JP | 2005-100342 A | 4/2005 |

OTHER PUBLICATIONS

Japanese Office Action issued on Oct. 11, 2011 in the corresponding Japanese Patent Application No. 2007-172207.

* cited by examiner

*Primary Examiner* — Marivelisse Santiago Cordero
*Assistant Examiner* — Miya J Cato
(74) *Attorney, Agent, or Firm* — Sughrue Mion, PLLC

(57) ABSTRACT

A computer readable medium storing a program causing a computer to execute a process for managing print processing, the process includes: acquiring plural pieces of command information; acquiring, when receiving a request for list information from a printer of the printers, retrieval information including request location information which indicates location of the requesting printer; generating the list information including a first group; providing, to the printer requesting the list information, screen information including the list information generated in the generating process. The first group includes at least one of the pieces of command information, each piece of command information contained in the first group satisfies a condition that the location indicated by the request location information, belongs to the same area as the location indicated by the print location information.

9 Claims, 8 Drawing Sheets

FIG. 3A

211 COMMAND INFORMATION MANAGEMENT TABLE

| COMMAND INFORMATION ID | TARGET DATA NAME | COMMAND TIME | COMMAND HOST | COMMAND USER | OUTPUT LOCATION | OUTPUT START TIME |
|---|---|---|---|---|---|---|
| Job1 | DEVELOPMENT PLAN | 2007/1/1 10:00 | 123.123.001.100 | ZZZ | A BUSINESS PLACE | |
| Job2 | TODAY SCHEDULE | 2007/1/1 10:15 | 123.123.001.100 | XXX | | |
| Job3 | TODAY SCHEDULE | 2007/1/1 10:20 | 123.123.001.100 | XXX | C BUSINESS PLACE | 2007/1/11 10:00 |
| Job4 | CONFERENCE MATERIAL | 2007/1/2 10:00 | 133.123.033.200 | YYY | C BUSINESS PLACE | |
| Job5 | PROCEEDINGS | 2007/1/2 10:15 | 123.123.001.100 | XXX | | 2007/1/11 10:15 |
| Job6 | PROCEEDINGS | 2007/1/2 12:00 | 123.123.001.100 | XXX | C BUSINESS PLACE, SECOND FLOOR | |
| Job7 | EXPLANATION MATERIAL | 2007/1/2 12:15 | 123.123.001.100 | XXX | C BUSINESS PLACE, FIRST FLOOR | 2007/1/10 10:00 |
| Job8 | ESTIMATE SHEET | 2007/1/3 15:00 | 135.234.001.120 | ZZZ | A BUSINESS PLACE | |
| Job9 | PROPOSAL | 2007/1/3 16:00 | 246.100.001.150 | YYY | | 2007/1/11 12:00 |
| Job10 | REPORT | 2007/1/3 17:00 | 123.123.001.100 | XXX | C BUSINESS PLACE | |
| ... | ... | ... | ... | ... | ... | ... |

FIG. 3B

212 LOCATION INFORMATION MANAGEMENT TABLE

| LOCATION | SUBNET |
|---|---|
| A BUSINESS PLACE | 123.123.001.001 TO 123.123.032.254 |
| B BUSINESS PLACE | 123.123.033.001 TO 123.123.064.254 |
| C BUSINESS PLACE, SECOND FLOOR | 135.234.001.001 TO 135.234.064.254 |
| C BUSINESS PLACE, FIRST FLOOR | 246.100.001.001 TO 246.100.064.254 |
| ... | ... |

US 8,300,249 B2

COMMAND INFORMATION MANAGEMENT APPARATUS, PRINT SYSTEM AND COMPUTER READABLE MEDIUM

CROSS-REFERENCE TO RELATED APPLICATIONS

This application is based on and claims priority under 35 USC 119 from Japanese Patent Application No. 2007-172207 filed Jun. 29, 2007.

BACKGROUND

1. Technical Field

This invention relates to a command information management apparatus, a print system, a computer readable medium.

2. Related Arts

Hitherto, a print system wherein a copier which performs print processing in accordance with a print job is connected to a job list display which displays a print job list through a network has been known.

SUMMARY

According to an aspect of the invention, a computer readable medium storing a program causing a computer to execute a process for managing command information, the process includes: acquiring plural pieces of command information, each piece of command information including (i) descriptions of a print processing and (ii) print location information which indicates location of a printer that executes the print processing, of plural printers disposed in respective areas; acquiring, when receiving a request for list information from a printer of the printers, retrieval information including request location information which indicates location of the requesting printer; generating the list information including a first group; providing, to the printer requesting the list information, screen information including the list information generated in the generating process. The first group includes at least one of the pieces of command information. Each piece of command information contained in the first group satisfies a condition that the location indicated by the request location information contained in the retrieval information acquired in the acquiring the retrieval information process, belongs to the same area as the location indicated by the print location information contained in each piece of command information acquired in the acquiring the pieces of command information process.

BRIEF DESCRIPTION OF THE DRAWINGS

Exemplary embodiments of the present invention will be described in detail based on the following figures, wherein

FIG. 3A is a drawing to show an example of a command information management table and FIG. 3B is a drawing to show an example of a location information management table;

DETAILED DESCRIPTION

Figure 1:
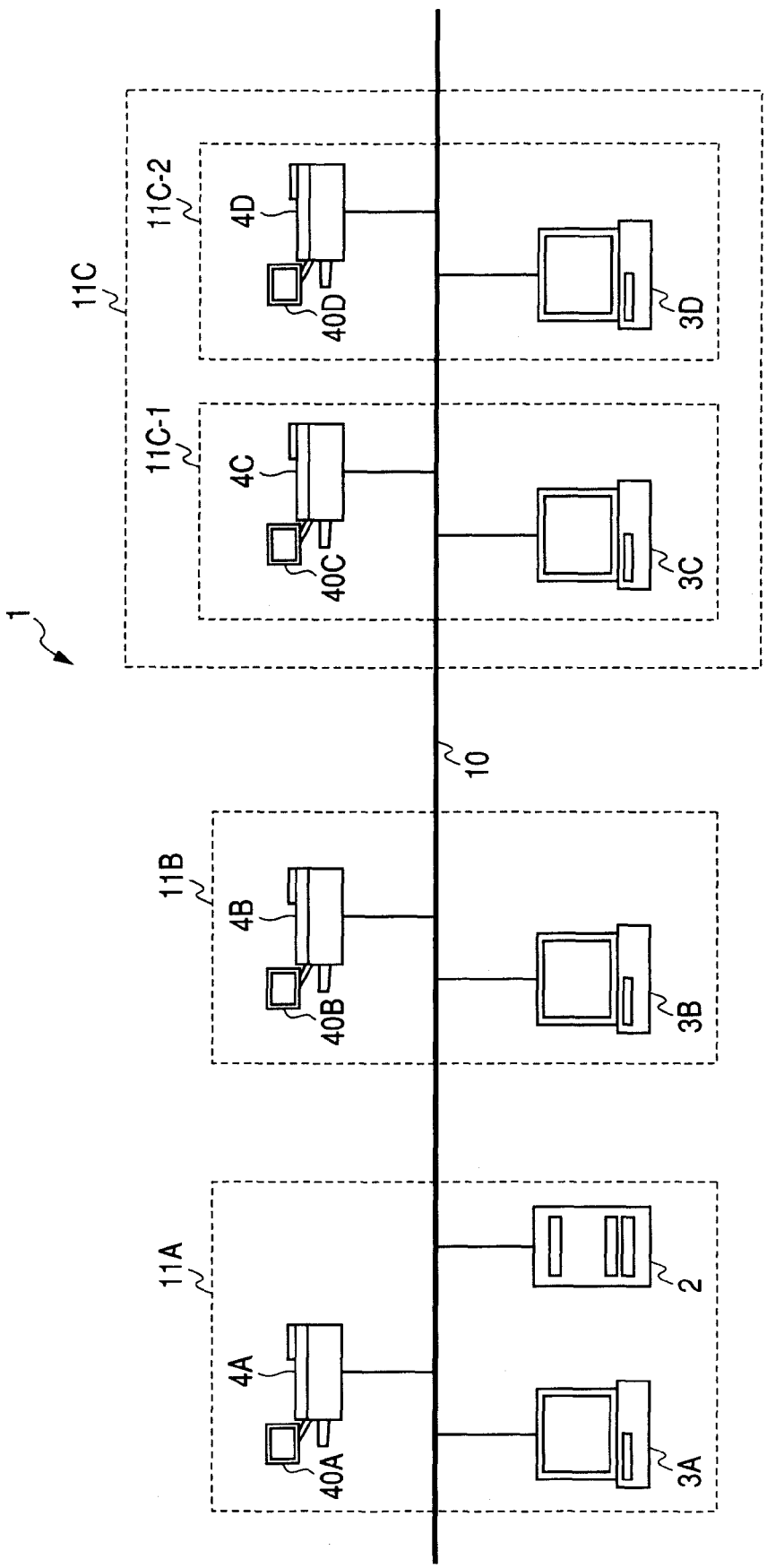
FIG. 1 is a general view to show an example of the schematic configuration of a print system according to an exemplary embodiment of the invention.

FIG. 1 is a general view to show an example of the schematic configuration of a print system according to an exemplary embodiment of the invention. A print system 1 includes terminals 3A to 3D for entering command information concerning print processing, a command information management server 2 for managing the command information and providing the command information in response to a request, printers 4A to 4D for executing print processing based on the command information, and a network 10 for connecting them mutually. The terminals 3A to 3D and the printers 4A to 4D are disposed in respective areas in three business places 11A to 11C as plural areas.

The command information management server 2, the terminal 3A, and the printer 4A are disposed in the A business place 11A, and the terminal 3B and the printer 4B are disposed in the B business place 11B. The C business place 11C has a first floor 11C-1 and a second floor 11C-2. The terminal 3C and the printer 4C are disposed on the first floor 11C-1 of the C business place 11C and further the terminal 3D and the printer 4D are disposed on the second floor 11C-2 of the C business place 11C.

The term "area" refers to one segment when the whole zone managed by the command information management server 2 is segmented in predetermined units. The whole zone may be an aggregate made up of a company, an affiliated company, a counterparty, etc.

The predetermined units in which the whole zone is segmented into a plurality of areas can use physical units, organic units, network units, and the like. The physical units are, for example, business places and floors as shown in FIG. 1. If plural buildings and rooms exist in one business place, the buildings and rooms are applied. As the organic units, for example, departments, affiliations, and the like classified according to the business in charge are applied. As the network units, domains for managing the command information management server 2, the terminals 3A to 3D, and the printers 4A to 4D connected to the network 10, work groups, subnets described later, and the like are applied.

The number of the business places is not limited to three and may be four or more or may be two or less. In FIG. 1, one terminal and one printer are disposed in one business place or on one floor, but two or more terminals and two or more printers may be disposed or only either of the terminal and the printer may be disposed. The business place may be an office or may be a store of a convenience store, etc., or may be a combination thereof.

The term "command information" is used to mean information for giving a print processing command to the printers 4A to 4D. The command information contains (i) the descriptions of print processing such as the target data name for specifying the image data to be printed, the number of print copies, the paper size and the like, (ii) print location information indicating the output location of any of the printers 4A to 4D for executing the print processing among the printers 4A to 4D disposed in plural areas in respective areas, and start time information indicating the output start time of the print processing.

The command information may contain the command time indicating the time at which the print processing command was entered, the command host indicating the terminal 3A to 3D where the command was entered, the command user entering the command, and the like.

Each of the printers 4A to 4D includes (i) a touch panel display with a touch panel superposed on the surface of the display and (ii) a display operation section 40A to 40D including hard keys of a start key, etc., and executes print processing based on the command information sent from the command information management server 2.

Each of the printers 4A to 4D may includes a printer unit for executing print processing and the display operation section 40A to 40D as separate bodies; for example, each printer may includes the printer unit, a terminal including an input section for inputting an operation command to the printer unit, a display section including a liquid crystal display, etc., for displaying an operation screen, etc., a communication section connected to the printer unit, and the like. A multiple function processing machine having multiple functions of copy, print, scan, fax, etc., may be used in place of the printer 4A to 4D.

(Command Information Management Server)

Figure 2:
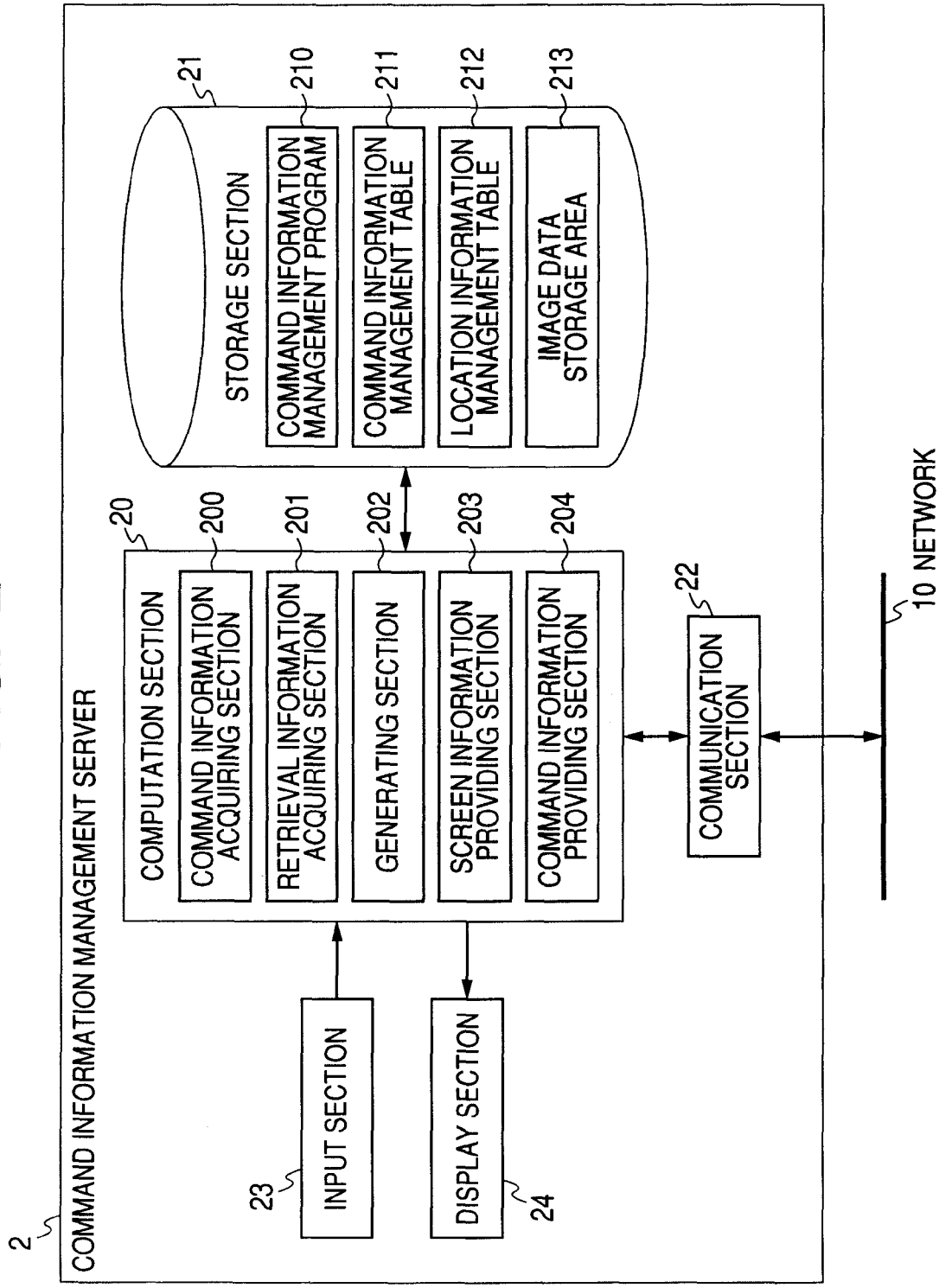
FIG. 2 is a block diagram to show an example of the schematic configuration of a command information management server according to the exemplary embodiment of the invention.

FIG. 2 is a block diagram to show an example of the schematic configuration of the command information management server 2. The command information management server 2 includes (i) computation section 20 including a CPU, etc., (ii) a storage section 21 including ROM, RAM, a hard disk, etc., for storing various programs, data, etc., (iii) a communication section 22 including a network interface card, etc., connected to the network 10 for transmitting and receiving data, (iv) an input section 23 including a keyboard, a mouse, etc., for accepting data input and an operation command, and (v) a display section 24 including a liquid crystal display, etc., for displaying the operation result of the computation section 20 and the like.

The command information management server 2 may be implemented not only as a server, but also a personal computer (PC), a workstation (WS), etc., for example.

A command information management program 210, a command information management table 211, a location information management table 212 and the like are stored in the storage section 21. The image data to be printed is stored in an image data storage area 213 provided in the storage section 21.

FIG. 3A is a drawing to show an example of the command information management table 211. Command information sent from the terminals 3A to 3D is stored in the command information management table 211. That is, the target data name, the command time, the command host, the command user, the output location, and the output start time are stored in the command information management table 211 with the command information ID for identifying each piece of command information as a key.

FIG. 3B is a drawing to show an example of the location information management table 212. Subnets assigned to the business places 11A to 11C are stored in the location information management table 212 for each of the business places 11A to 11C.

The subnets are stored as IP addresses having, for example, common high-order 16 bits assigned to the business places 11A to 11C respectively. So command information management server 2, the terminals 3A to 3D, and the printers 4A to 4D connected to the network 10 are classified to smaller network units by using the subnet. Namely, the network 10 is divided into units of the business places 11A to 11C in FIG. 3B.

The image data to be printed is stored in the image data storage area 213 in association with the target data name of the command information stored in the command information management table 211.

The computation section 20 operates in accordance with the command information management program 210 stored in the storage section 21, whereby it functions as command information acquiring section 200, retrieval information acquiring section 201, generating section 202, screen information providing section 203, command information providing section 204, etc.

The command information acquiring section 200 acquires command information to the printers 4A to 4D through the network 10 from the terminals 3A to 3D and registers the acquired command information in the command information management table 211.

When the retrieval information acquiring section 201 receives a request for list information including pieces of command information of print processing from any of the printers 4A to 4D, the retrieval information acquiring section 201 acquires retrieval information containing request location information indicating the location of the requesting printer 4A to 4D from the printer 4A to 4D.

The "request location information" contained in the retrieval information is information for determining each of the printers 4A to 4D such as the IP address assigned to each of the printers 4A to 4D or the host name, for example. In addition to the request location information, the retrieval information also includes user information indicating the user entering the operation command of the printer 4A to 4D, and acquisition time information indicating the acquisition time at which the list information request was acquired, etc.

If the retrieval information acquiring section 201 acquires the request location information of the printer 4A to 4D as the IP address, it references the location information management table 212 and acquires the location of the requesting printer 4A to 4D as the location corresponding to the subnet containing the IP address. For example, if the IP address acquired from the printer 4A to 4D is "246.100.001.010," the retrieval information acquiring section 201 acquires the location of the requesting printer as the second floor of the C business place, 11C-2, based on the location information management table 212 shown in FIG. 3B.

If the retrieval information acquiring section 201 acquires the request location information of the printer 4A to 4D as the host name, it acquires the location of the requesting printer 4A to 4D from the host name by previously determining the naming rule of the host name and analyzing the host name based on the naming rule. For example, if the naming rule is that the first character string should indicate a business place, the second character string should indicate a floor (first, second, etc.,), and the third character string should indicate a printer (PRT) or a terminal (PC) with "-" (hyphen) as a delimiter, when the host name acquired by the retrieval information acquisition section 201 is "1C-1F-PRT", the location of the printer indicated by the host name is acquired as the first floor of the C business place, 11C-1.

The generating section 202 generates list information including at least one of pieces of command information. each of at least the one of the pieces of command information satisfies a condition that the output location indicated by the print location information contained in the command information acquired by the command information acquiring section 200, belongs to the same area as the location of the printer 4A to 4D indicated by the request location information based on the retrieval information acquired by the retrieval information acquiring section 201.

For example, when the location indicated by the request location information contained in the retrieval information is the A business place 11A, the generating section 202 extracts pieces of command information with the output location specified as the same A business place 11A in the command information management table 211 shown in FIG. 3. Namely, two pieces of command information with command information IDs Job1 and Job8 are extracted. And the generating section 202 generates list information including the two pieces of command information.

If the output location of the command information is not specified, the generating section 202 may generate list information based on the location of the command host indicating the terminal 3A to 3D where the command information was entered, for example. That is, when the location indicated by the request location information of the retrieval information is the A business place, the generating section 202 acquires the location where the command host is disposed from the location information management table 212 based on the IP address recorded in the command host in the command information management table 211 shown in FIG. 3A. The generating section 202 generates list information including seven pieces of command information. The seven pieces of command information satisfies a condition that the location where the command host is disposed is within the same business place A 11A (Job1 to Job3, Job5 to Job7, and Job10).

When the command information contains the output start time of print processing, the generating section 202 generates list information by giving a higher priority to the command information with satisfying a condition that the difference between the time at which retrieval information was acquired by the retrieval information acquiring section 201 and the output start time is within a predetermined time.

For example, when the time at which retrieval information was acquired is "2007/1/11 10:20" and the predetermined time is set to 30 minutes, the generating section 202 generates list information including pieces of command information with satisfying a condition that the difference between the acquisition time and the output start time is within 30 minutes, namely, the output start time is within 30 minutes from "2007/1/11 10:20" in the command information management table 211 shown in FIG. 3 (Job3 and Job5).

If the command information does not contain the output start time, the generating section 202 may generate list information based on the command time at which the command information was entered, contained in the command information, for example. For example, when the time at which retrieval information was acquired is "2007/1/3 17:15" and the predetermined time is set to two hours, the generating section 202 generates list information including pieces of command information with satisfying a condition that the difference between the acquisition time and the command time is within two hours, namely, the command time is within two hours from "2007/1/3 17:15" in the command information management table 211 shown in FIG. 3 (Job9 and Job10). In addition to the above-mentioned time examples, the predetermined time may be specified in date like 2007/1, 2007/1/3, etc., for example.

For example, if plural pieces of command information with the same target data name are stored in the command information management table 211, the generating section 202 may extract only one of the pieces of the command information to generate list information. For example, in the command information management table 211 shown in FIG. 3, the generating section 202 excludes Job2 of Job2 and Job3 with the duplicate target data name "today schedule" and likewise excludes Job5 of Job5 and Job6 with the duplicate target data name "proceedings". The generating section 202 generates list information including pieces of command information corresponding to the remaining command information IDs.

Further, the generating section 202 may extract pieces of command information with satisfying a condition that the user information contained in the retrieval information and the command user contained in the command information are the same user and generate list information based on the condition. For example, if the user indicated by the retrieval information is "ZZZ", the generating section 202 generates list information including pieces of command information with the command user "ZZZ" (Job1 and Job8) in the command information management table 211 shown in FIG. 3.

The extraction conditions for generating the list information described above may be assigned a priority and arbitrarily combined. The extraction condition may be determined for each user or for each group to which two or more users belong, may be determined for each of the printers 4A to 4D, or may be determined by the user each time the user operates the printer 4A to 4D. Position information for determining the position by the address or the latitude and longitude may be stored in the location information management table 212 and the generating section 202 may specify the same area according to the distance like within a 50-meter radius to generate list information. Further, if there is no command information corresponding to the extraction condition, the generating section 202 may generate list information including all pieces of command information recorded in the command information management table 211.

The generating section 202 may generate list information including (i) pieces of command information with the output location indicated by the print location information contained in each piece of command information belonging to the same area as the location of the printer 4A to 4D indicated by the request location information and (ii) pieces of command information with the output location not belonging to the same area as the location of the printer. The former command information pieces are assigned a higher priority than the latter command information pieces.

The screen information providing section 203 provides, for the printer 4A to 4D making the request for the screen information, screen information containing the list information generated by the generating section 202.

When specific command information is selected out of the list information contained in the screen information provided by the screen information providing section 203, the command information providing section 204 provides the specific command information for the printer 4A to 4D.

(Terminal)

Each of the terminals 3A to 3D includes (i) a CPU for controlling the sections of the terminal 3A to 3D, (ii) a storage section made up of ROM, RAM, a hard disk, etc., for storing programs such as a command information creation program and a document creation program, data, etc., (iii) a communication section connected to the network 10 and made up of a network interface card, etc., for example, (iv) an input section including a keyboard, a mouse, etc., for accepting data input and an operation command, and (v) a display section including a liquid crystal display, etc., for displaying a screen and the like.

Each of the terminals 3A to 3D can be implemented as a personal computer (PC), a portable information terminal (PDA), etc., for example.

The CPU of each of the terminals 3A to 3D operates in accordance with the command information creation program stored in the storage section, whereby it functions as (i) input screen display section for displaying a command information input screen for entering command information, on the display section, (ii) command information generating section for generating command information based on input information entered through the input section into the command information input screen, (iii) command information transmission section for transmitting the created command information to the command information management server 2, and the like.

The CPU of each of the terminals 3A to 3D operates in accordance with the document creation program, thereby creating a document to be printed, namely, image data to be printed and storing the image data in the storage section of the terminal 3A to 3D. The image data to be printed may be stored in any other terminal connected to the network 10 or the command information management server 2 or may be input through an external record medium, etc.

(Printer)

In addition to the above-mentioned display operation section 40A to 40D, Each of the printers 4A to 4D includes (i) a CPU for controlling the sections of the printer 4A to 4D, (ii) a storage section made up of ROM, RAM, a hard disk, etc., for storing programs such as a printer control program, data, etc., (iii) a print section for printing an image on a record medium of paper, etc., and (iv) a communication section connected to the network 10.

The CPU of each of the printers 4A to 4D operates in accordance with the printer control program stored in the storage section, whereby it functions as (i) screen information request section for requesting the command information management server 2 to send screen information for displaying a selection screen to select command information on the display operation section 40A to 40D, (ii) selection screen display section for displaying the selection screen on the display operation section 40A to 40D based on the screen information received for the request, (iii) command information request section for requesting the command information management server 2 to send the command information selected for the selection screen through the display operation section 40A to 40D, (iv) image creation section for creating an image for print output from the command information received for the request, and the like.

The print section prints an image created by image creation section on a record medium of paper, etc., and can use any of various systems of electrophotography, ink jet, thermal transfer, etc.

(Operation of Embodiment)

Figure 4:
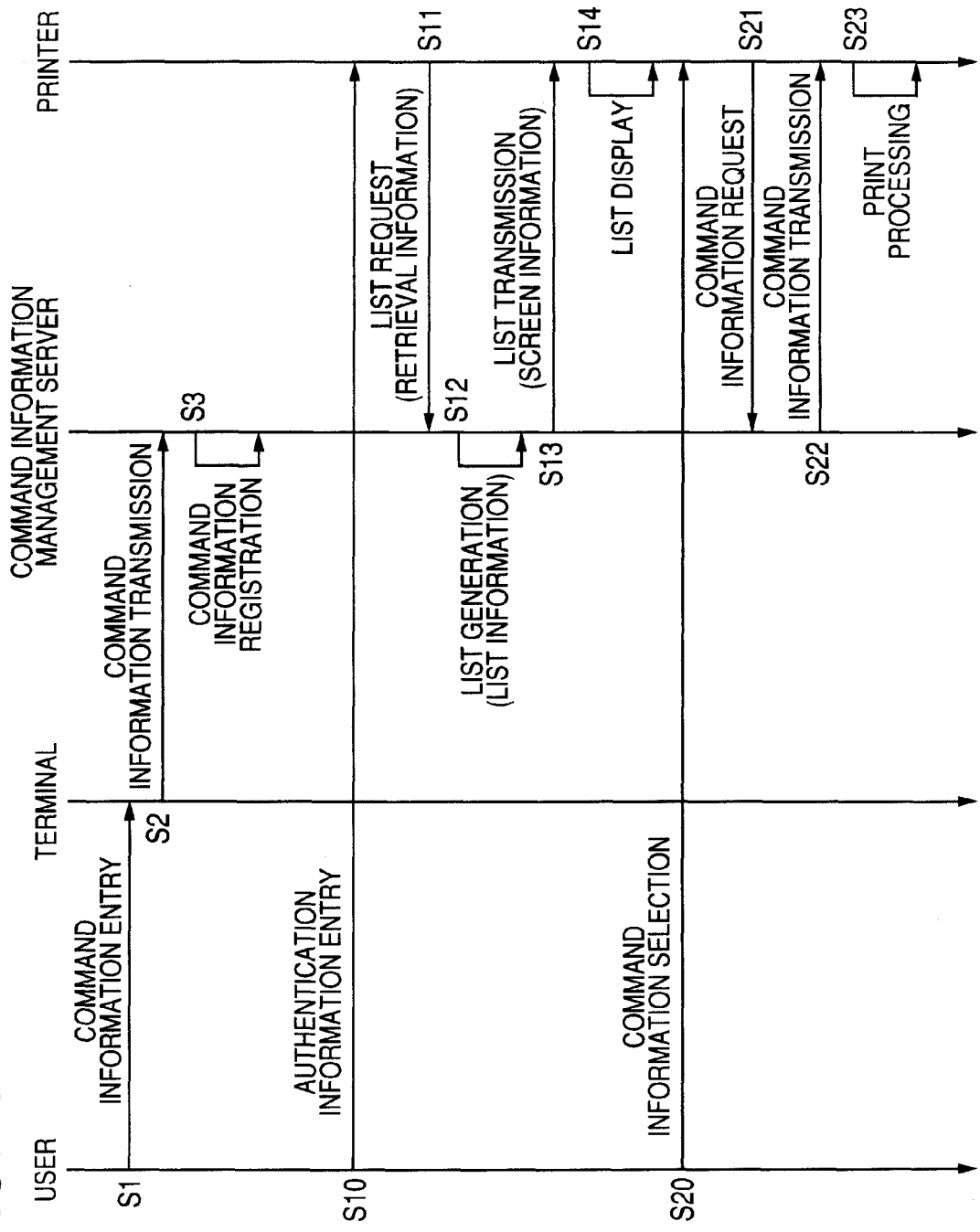
FIG. 4 is a timing chart to show an example of the operation of the print system according to the exemplary embodiment of the invention.

Next, an example of the operation of the print system 1 according to the exemplary embodiment of the invention will be discussed with reference to FIGS. 4 and 5. The case where the user with user name "XXX" enters plural pieces of command information by using the terminal 3A disposed in the A business place 11A and further plural users enter plural pieces of command information by using the terminals 3A to 3D and then, the user "XXX" selects a specific piece of command information from the pieces of command information and executes print processing with the printer 4C disposed on the first floor of the C business place, 11C-1, will be discussed according to a timing chart of FIG. 4.

(1) Entry of Command Information

First, if the user "XXX" enters a command through the input section of the terminal 3A so as to display a command information input screen, the input screen display section of the terminal 3A accepts the command and displays the command information input screen on the display section. The user enters his or her user name "XXX," the target data name, the output location, the output start time, etc., as command information into the displayed command information input screen through the input section (S1).

Next, upon reception of the input information entered through the input section, the command information creation section of the terminal 3A creates command information based on the input information.

Next, the command information transmission section of the terminal 3A reads the image data specified as the image data to be printed by the target data name from the storage section of the terminal 3A and transmits the image data together with the created command information through the network 10 to the command information management server 2 (S2).

The command information acquiring section 200 of the command information management server 2 receives the command information and the image data sent from the terminal 3A by the communication section 22, registers the received command information in the command information management table 211 of the storage section 21, and stores the image data in the image data storage area 213 (S3).

Likewise, if plural users enter command information by using the terminals 3A to 3D (S1), the command information creation sections of the terminals 3A to 3D receive the command information entered through the input sections and create command information based on the entered information. The command information transmission sections of the terminals 3A to 3D transmit the created command information and the image data to the command information management server 2 (S2).

The command information acquiring section 200 of the command information management server 2 receives the command information and the image data sent from the terminals 3A to 3D, registers the received command information in the command information management table 211, and stores the image data in the image data storage area 213 (S3).

Thus, plural pieces of command information entered by the users are registered in the command information management table 211 as shown in FIG. 3.

(2) List Display of Command Information

If the user "XXX" gives an operation start command to the printer 4C disposed on the first floor of the C business place, 11C-1, the CPU of the printer 4C displays an authentication screen for the user to enter user information including the user name and the password on the display operation section 40C.

Next, when the user enters user information into the authentication screen through the display operation section 40C, the CPU of the printer 4C determines whether or not to authenticate the user based on the entered user information (S10). If the CPU does not authenticate the user, it displays a message to the effect that the user is not authenticated on the display operation section 40C and terminates the processing; if the CPU authenticates the user, it goes to the next step.

Next, if the CPU of the printer 4C authenticates the user, the screen information request section of the printer 4C requests through the network 10 the command information management server 2 to send screen information (S11).

Next, the retrieval information acquiring section 201 of the command information management server 2 receives the request from the printer 4C and acquires retrieval information of the request location information of IP address "135.234.001.200" assigned to the printer 4C, the user information of the user "XXX" authenticated at present by the printer 4C, and the like.

From the acquired IP address "135.234.001.200" of the printer 4C, the retrieval information acquiring section 201 acquires the location where the printer 4C is disposed on the first floor of the C business place, 11C-1, according to the location information management table 212.

Next, the generating section 202 of the command information management server 2 generates list information including pieces of command information with satisfying a condition that the output location indicated by the print location information contained in the command information recorded in the command information management table 211 belongs to the same area as the location of the printer 4A to 4D indicated by the request location information based on the retrieval information acquired by the retrieval information acquiring section 201 (S12).

Here, the case where the generating section 202 generates list information including pieces of command information with the same business place specified as the same area and further specified and requested by the same user will be discussed. The generating section 202 extracts pieces of command information corresponding to the command user "XXX" from the command information management table 211 shown in FIG. 3 (Job2, Job3, Job5, Job6, Job7, and Job10) as the pieces of command information specified by the user "XXX" indicated by the user information of the retrieval information. From the extracted pieces of command information, the generating section 202 further extracts the pieces of command information with the same business place as the location of the printer C (the first floor of the C business place, 11C-1) acquired by the retrieval information acquiring section 201, namely, the C business place 11C and the first and second floors of the C business place, 11C-1 and 11C-2, specified as the output location (Job3, Job6, Job7, and Job10), and generates list information.

Next, the screen information providing section 203 of the command information management server 2 transmits screen information containing the list information generated by the generating section 202 to the printer 4C (S13).

Next, upon reception of the screen information sent from the command information management server 2, the selection screen display section of the printer 4C displays a selection screen on the display operation section 40C based on the screen information (S14).

Figure 5:
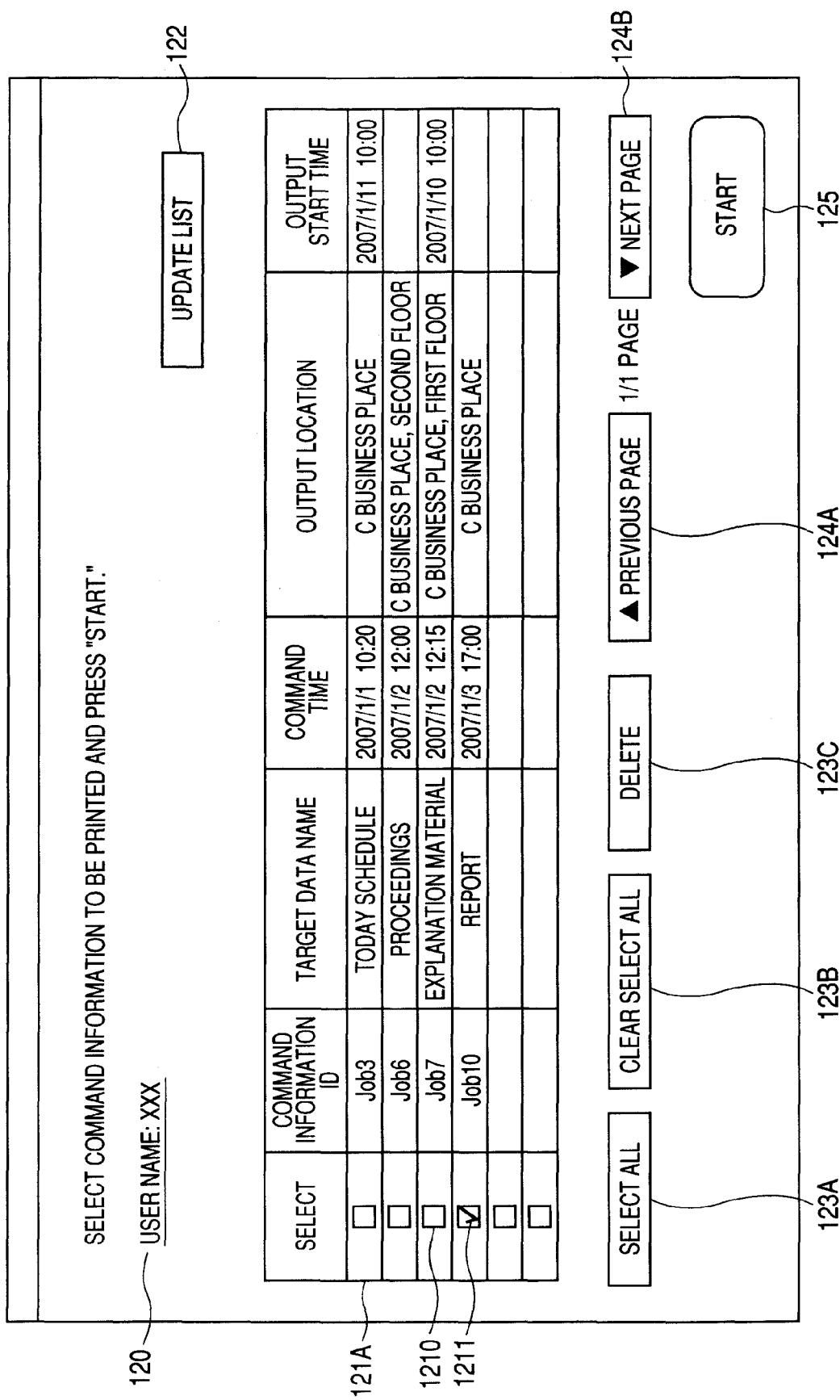
FIG. 5 is a drawing to show an example of a selection screen displayed on a printer according to the exemplary embodiment of the invention.

FIG. 5 shows an example of the selection screen displayed on the display operation section 40C. A user name 120 of the authenticated user is displayed at the upper stage of selection screen 12A, a command information list 121A based on the list information generated by the generating section 202 and various buttons for entering operation commands in the command information list 121A are displayed at the middle stage, and a start button 125 for entering a print processing start command is displayed at the lower stage.

Displayed at the middle stage of the selection screen 12A, as the buttons for entering operation commands in the command information list 121A are (i) an update button 122 for entering an update command of the command information list 121A, (ii) an all selection button 123A for selecting all command information displayed in the command information list 121A, (iii) an all cancel button 123B for canceling all selected command information, (iv) a deletion button 123C for deleting command information, and (v) a previous screen button 124A and a next screen button 124B for switching pages when the command information list 121A is made up of two or more pages.

In the command information list 121A, check boxes 1210 are placed in a one-to-one correspondence with the rows displaying the command information. The user enters a check mark 1211 in the check box 1210 corresponding to the command information to perform print processing through the display operation section 40C.

(3) Selection of Command Information and Execution of Print Processing

The user enters a check mark 1211 through the display operation section 40C in the check box 1210 corresponding to the command information to perform print processing from among plural pieces of command information displayed in the command information list 121A of the selection screen 12A. And the user presses the start button 125 (S20).

Next, upon acceptance of pressing the start button 125, the command information request section of the printer 4C requests the command information management server 2 to transmit, to the printer 4C, the command information selected by the user and the image data corresponding to the command information (S21).

Next, upon reception of the request from the printer 4C, the command information providing section 204 of the command information management server 2 reads the image data corresponding to the target data name recorded in the selected command information from the image data storage area 213 and transmits the read image data together with the selected command information to the printer 4C (S22).

Upon reception of the command information and the image data sent from the command information management server 2, the image creation section of the printer 4C creates an image for print output from the received image data and prints the image for print output on paper, etc., in accordance with the descriptions of the print processing of the command information by the print section and then terminates the print processing (S23).

(Modified Examples of Selection Screens)

Figure 6:
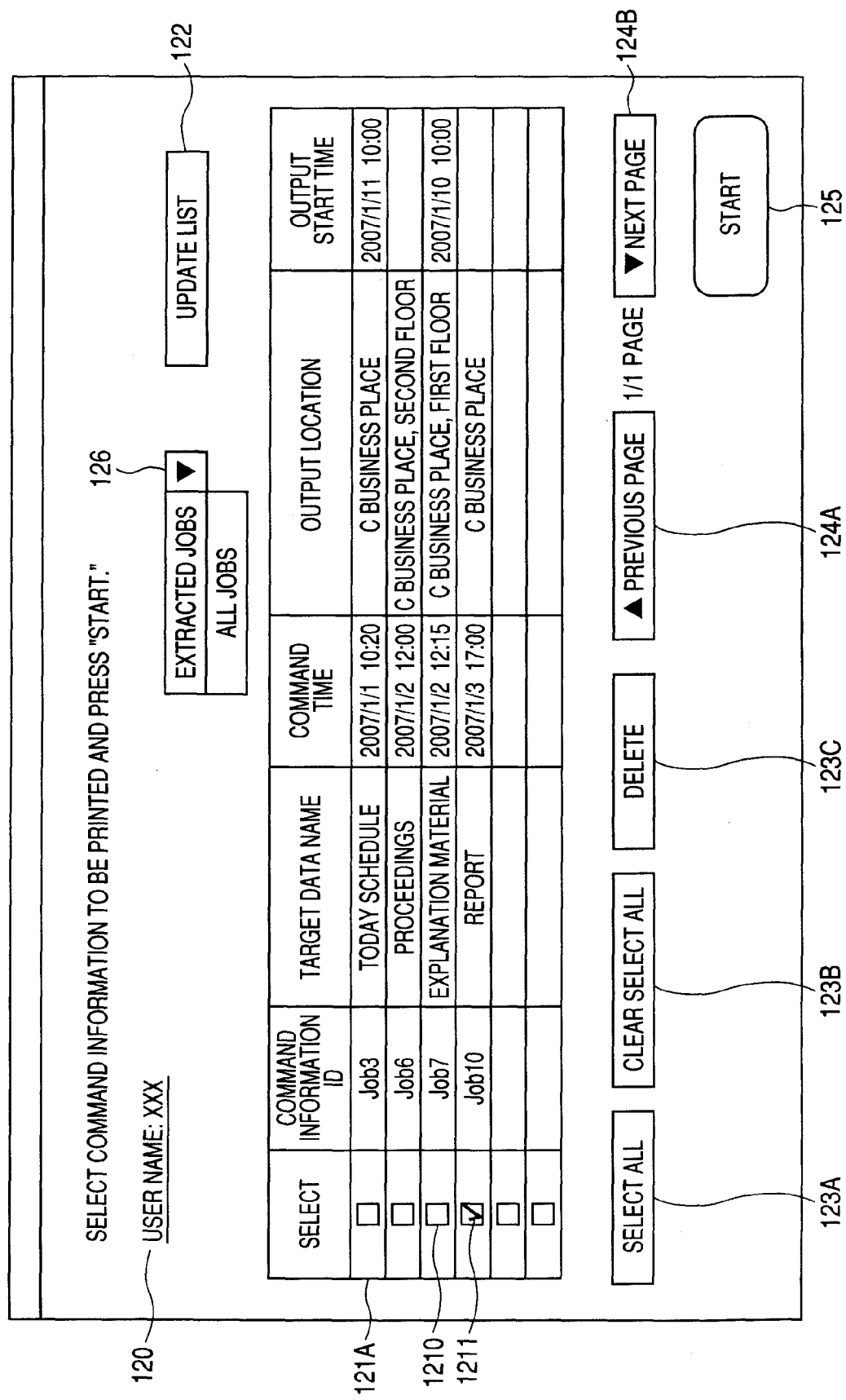
FIG. 6 is a drawing to show a first modified example of the selection screen displayed on the printer according to the exemplary embodiment of the invention.

Next, modified examples of the selection screens displayed on the printers 4A to 4D will be discussed with reference to FIGS. 6 to 8. FIG. 6 is a drawing to show an example of a selection screen of a first modified example. A user name 120, a command information list 121A, and various buttons of a start button 125, etc., are displayed on a selection screen 12B like the selection screen 12A shown in FIG. 5 and further a list switch box 126 is displayed above the command information list 121A.

The list switch box 126 is provided for the user to switch the list contents displayed in the command information list 121A and has options of "extracted jobs" for switching to a list based on the list information generated by the generation section 202 of the command information management server 2 and "all jobs" for switching to a list for displaying all command information stored in the command information management table 211. Two lists may be displayed on the selection screen in such a manner that a list corresponding to "extracted jobs" is displayed as one list and a list corresponding to "all jobs" is displayed as the other.

Figure 7:
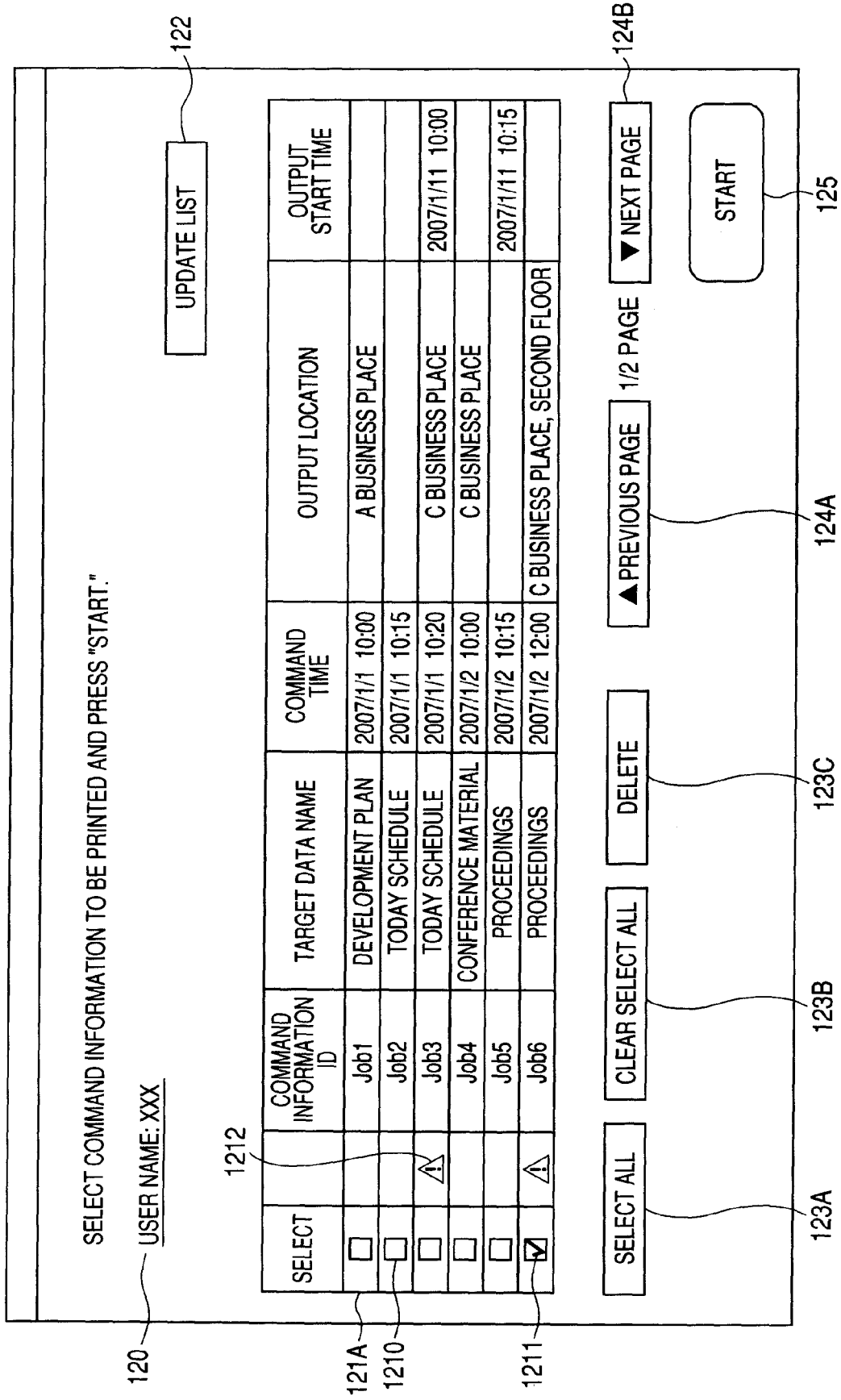
FIG. 7 is a drawing to show a second modified example of the selection screen displayed on the printer according to the exemplary embodiment of the invention.

FIG. 7 is a drawing to show an example of a selection screen of a second modified example. The list information generated by the generating section 202 of the command information management server 2 is displayed in the command information list 121A on the selection screen 12A shown in FIG. 5; while, a selection screen 12C has a command information list 121B displaying all command information stored in the command information management table 211 and an extraction mark 1212 like an exclamation mark, for example, for distinguishing between the command information corresponding to the list information generated by the generating section 202 of the command information management server 2 and any other command information is displayed in the command information list 121B. As the extraction mark 1212, the color and pattern of the background of the command information list 121B or irregularity, contours, and the like on the screen may be used to distinguish the command information if the command information can be distinguished.

Figure 8:
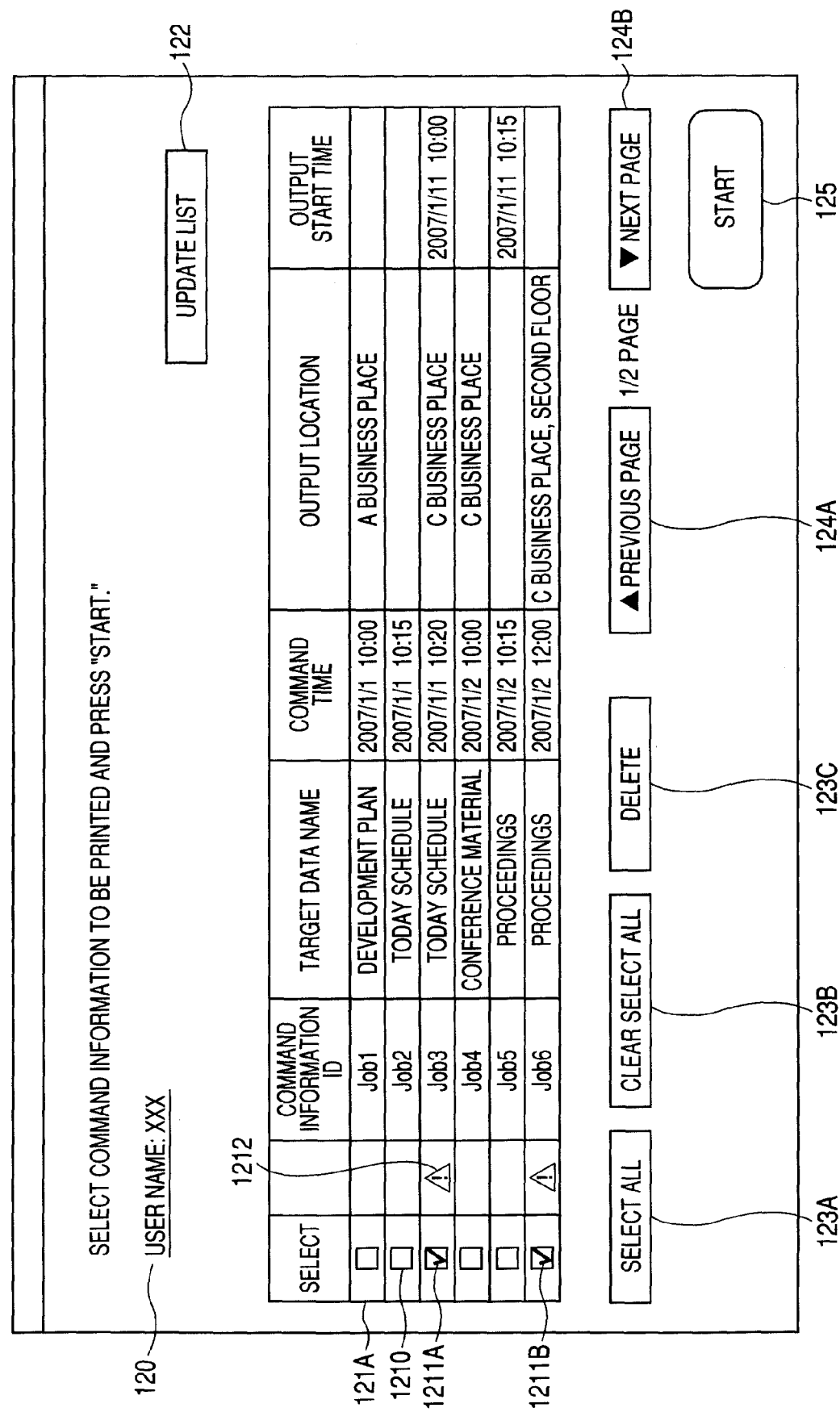
FIG. 8 is a drawing to show a third modified example of the selection screen displayed on the printer according to the exemplary embodiment of the invention.

FIG. 8 is a drawing to show an example of a selection screen of a third modified example. A user name 120, a command information list 121B, and various buttons of a start button 125, etc., are displayed on a selection screen 12D like the selection screen 12C shown in FIG. 7 and further check marks 1211A to 1211B are previously entered in the command information corresponding to the list information generated by the generating section 202 of the command information management server 2 in the command information list 121B.

The command information list 121A, 121B may display not only target data name, command time, output location, and output start time, but also any other information contained in the command information such as command host. The command information list 121A, 121B may have a sort function of sorting the command information in the list under a predetermined condition, a retrieval function of retrieving command information in the list with a predetermined keyword, a filtering function of extracting command information in the list under a predetermined condition, etc.

It is to be understood that the invention is not limited to the specific exemplary embodiment described above and various modifications and changes may be made without departing from the spirit and the scope of the invention. For example, in the exemplary embodiment described above, the command information acquiring section 200, the retrieval information acquiring section 201, the generating section 202, the screen information providing section 203, and the command information providing section 204 of the command information management server 2 are implemented as the computation section 20 and the command information management program 210, but some or all of the sections may be implemented as hardware of an application-specific IC (ASIC), etc.

The print system 1 may have the functions of the command information management server 2, the terminals 3A to 3D, and the printers 4A to 4D as the whole print system; for example, the functions of the terminal 3A and the printer 4A installed in the A business place 11A may be installed in one apparatus.

The programs used in the exemplary embodiment described above may be read into the storage section in the apparatus from a record medium such as a CD-ROM or may be downloaded into the storage section in the apparatus from a server, etc., connected to a network such as the Internet.

What is claimed is:

1. A non-transitory computer readable medium storing a program causing a computer to execute a process for managing command information, the process comprising:
   acquiring plural pieces of the command information, each piece of command information including (i) descriptions of a print processing and (ii) print location information which indicates location of a printer that executes the print processing, of plural printers disposed in respective areas;
   acquiring, when receiving a request for list information from a requesting printer of the printers, retrieval information including request location information which indicates location of the requesting printer;
   generating the list information including a first group, wherein the first group includes at least one of the pieces of command information,
   each piece of command information contained in the first group satisfies a condition that the location of the requesting printer indicated by the request location information contained in the retrieval information acquired in the acquiring the retrieval information process, belongs to a same area as the location indicated by the print location information contained in each piece of command information acquired in the acquiring the pieces of command information process; and
   providing, to the printer requesting the list information, screen information including the list information generated in the generating process,
   wherein when each piece of command information contains start time of the print processing, each of at least one of the pieces of the command information satisfying a time condition are given a higher priority in the list information, and
   the time condition is that the difference between (i) time at which the retrieval information was acquired in the acquiring the pieces of command information process and (ii) the start time is within a predetermined time.

2. The non-transitory computer readable medium as claimed in claim 1,
   wherein the list information includes (i) the first group, and (ii) a second group,
   the second group includes at least one of the pieces of command information,
   each piece of command information contained in the second group satisfies a condition that the location indicated by the print location information contained in each piece of command information belongs to a different area from the location of the printer indicated by the request location information, and
   each piece of command information contained in the first group, is assigned a higher priority in the list information than each piece of command information contained in the second group.

3. The non-transitory computer readable medium as claimed in claim 1, wherein a list switch box switches between a list of the first group and a list of all groups.

4. The non-transitory computer readable medium as claimed in claim 1, wherein the list information has at least one of a sort function which sorts the list information according to a predetermined sort condition, a retrieval function which retrieves the list information according to a predetermined keyword, and a filter function which extracts the list information according to a predetermined filter condition.

5. A command information management apparatus comprising:
   a command information acquiring section that acquires plural pieces of command information, each piece of command information including (i) descriptions of a print processing and (ii) print location information which indicates location of a printer that executes the print processing, of plural printers disposed in respective areas;
   a retrieval information acquiring section that acquires, when receiving a request for list information from a printer of the printers, retrieval information including request location information which indicates location of the requesting printer;
   a generating section that generates the list information including a first group,
   wherein the first group includes at least one of the pieces of command information, each piece of command information contained in the first group satisfies a condition that the location indicated by the request location information contained in the retrieval information acquired by the retrieval information acquiring section, belongs to the same area as the location indicated by the print location information contained in each piece of command information acquired by the command information acquiring section; and a screen information providing section that provides, to the printer requesting the list information, screen information including the list information generated by the generating section, wherein the generating section, when each piece of command information contains start time of the print processing, generates the list information in which each of at least one of the pieces of the command information satisfying a time condition is given a higher priority, and the time condition is that the difference between (i) time at which the retrieval information was acquired in the acquiring the pieces of command information process and (ii) the start time is within a predetermined time.

6. The command information management apparatus as claimed in claim 5, wherein the generating section generates the list information includes (i) the first group, and (ii) a second group, the second group includes at least one of the pieces of command information, each piece of command information contained in the second group satisfies a condition that the location indicated by the print location information contained in each piece of command information belongs to a different area from the location of the printer indicated by the request location information, and each piece of command information contained in the first group, is assigned a higher priority in the list information than each piece of command information contained in the second group.

7. A print system comprising:

plural printers that are disposed in respective areas;

a command information acquiring section that acquires plural pieces of command information, each piece of command information including (i) descriptions of a print processing and (ii) print location information which indicates location of a printer of printers, that executes the print processing;

a retrieval information acquiring section that acquires, when receiving a request for list information from a printer of the printers, retrieval information including request location information which indicates location of the requesting printer;

a generating section that generates the list information including a group, wherein the group includes at least one of the pieces of command information, each piece of command information contained in the group satisfies a condition that the location indicated by the request location information contained in the retrieval information acquired by the retrieval information acquiring section, belongs to the same area as the location indicated by the print location information contained in each piece of command information acquired by the command information acquiring section; and a screen information providing section that provides, to the printer requesting the list information, screen information including the list information generated by the generating section, wherein when each piece of command information contains start time of the print processing, each of at least one of the pieces of the command information satisfying a time condition are given a higher priority in the list information, and the time condition is that the difference between (i) time at which the retrieval information was acquired in the acquiring the pieces of command information process and (ii) the start time is within a predetermined time.

8. A non-transitory computer readable medium storing a program causing a computer to execute a process for managing command information, the process comprising;

acquiring plural pieces of the command information, each piece of command information including
  (i) descriptions of a print processing and (ii) print location information which indicates location of a printer that executes the print processing, of plural printers disposed in respective areas, or
  the descriptions of the print processing without the print location information;

acquiring, when receiving a request for list information from a requesting printer of the printers, retrieval information including request location information which indicates location of the requesting printer;

generating the list information including a first group or a second group, wherein the first group includes at least one of the pieces of command information, each piece of command information contained in the first group satisfies a condition that the location of the requesting printer indicated by the request location information contained in the retrieval information acquired in the acquiring the retrieval information process, belongs to the same area as the location indicated by the print location information contained in each piece of command information acquired in the acquiring the pieces of command information process, the second group includes all pieces of the command information; and providing, to the printer requesting the list information, screen information including the list information generated in the generating process, wherein the generating section, when each piece of command information contains start time of the print processing, generates the list information in which each of at least one of the pieces of the command information satisfying a time condition is given a higher priority, and the time condition is that the difference between (i) time at which the retrieval information was acquired in the acquiring the pieces of command information process and (ii) the start time is within a predetermined time.

9. A computer readable medium according to claim 8, wherein the list information is generated in the generating step when the list information including the second group is generated in a state that a check mark to select the command information for printing is added to the command information including the print location information of the printer corresponding to a place from which the printing is requested.

* * * * *